United States Patent

Hilliard et al.

[11] Patent Number: 5,116,594
[45] Date of Patent: May 26, 1992

[54] SALT HANDLING APPARATUS FOR A HYPOCHLOROUS ACID REACTOR

[75] Inventors: Garland E. Hilliard; James K. Melton; David A. Helmstetter, all of Cleveland, Tenn.

[73] Assignee: Olin Corporation, Cheshire, Conn.

[21] Appl. No.: 548,700

[22] Filed: Jul. 5, 1990

Related U.S. Application Data

[62] Division of Ser. No. 353,573, May 18, 1989.

[51] Int. Cl.$^5$ .................. B01D 46/02; B01D 46.04; C01B 11/04
[52] U.S. Cl. .................. 423/473; 55/302; 55/366; 55/372; 423/215.5
[58] Field of Search .......... 423/423, 215.5; 55/302, 55/372, 366

[56] References Cited

U.S. PATENT DOCUMENTS

| | | | |
|---|---|---|---|
| 2,347,151 | 4/1944 | Crawford et al. | 423/473 |
| 3,572,989 | 3/1971 | Tatara et al. | 423/474 |
| 3,877,899 | 4/1975 | Bundy et al. | 5/430 |
| 4,146,578 | 3/1979 | Brennan et al. | 423/474 |
| 4,416,864 | 11/1983 | Wojtowicz | 423/474 |
| 4,468,377 | 8/1984 | Sakowski et al. | 423/474 |
| 4,552,735 | 11/1985 | Iannicelli et al. | 423/230 |
| 4,865,760 | 9/1989 | Johnson et al. | 423/474 |
| 4,874,586 | 10/1989 | Szymanski | 422/1777 |
| 4,970,020 | 11/1990 | Johnson et al. | 423/474 |

FOREIGN PATENT DOCUMENTS 191718 8/1986 European Pat. Off. .......... 55/302

Primary Examiner—John Niebling
Assistant Examiner—Brian M. Bolam
Attorney, Agent, or Firm—Ralph D'Alessandro

[57] ABSTRACT

Apparatus for the separation of a solid salt by-product from the product gaseous hypohalogenated acid of a reactor is disclosed which is effective to separate particles ranging in size from about 0.5 to about 50 microns. The reactor mixes an aqueous alkali metal hydroxide and a gaseous halogen to produce the hypohalogenated acid product and solid salt by-product which are discharged from the reactor into the separation apparatus.

20 Claims, 1 Drawing Sheet

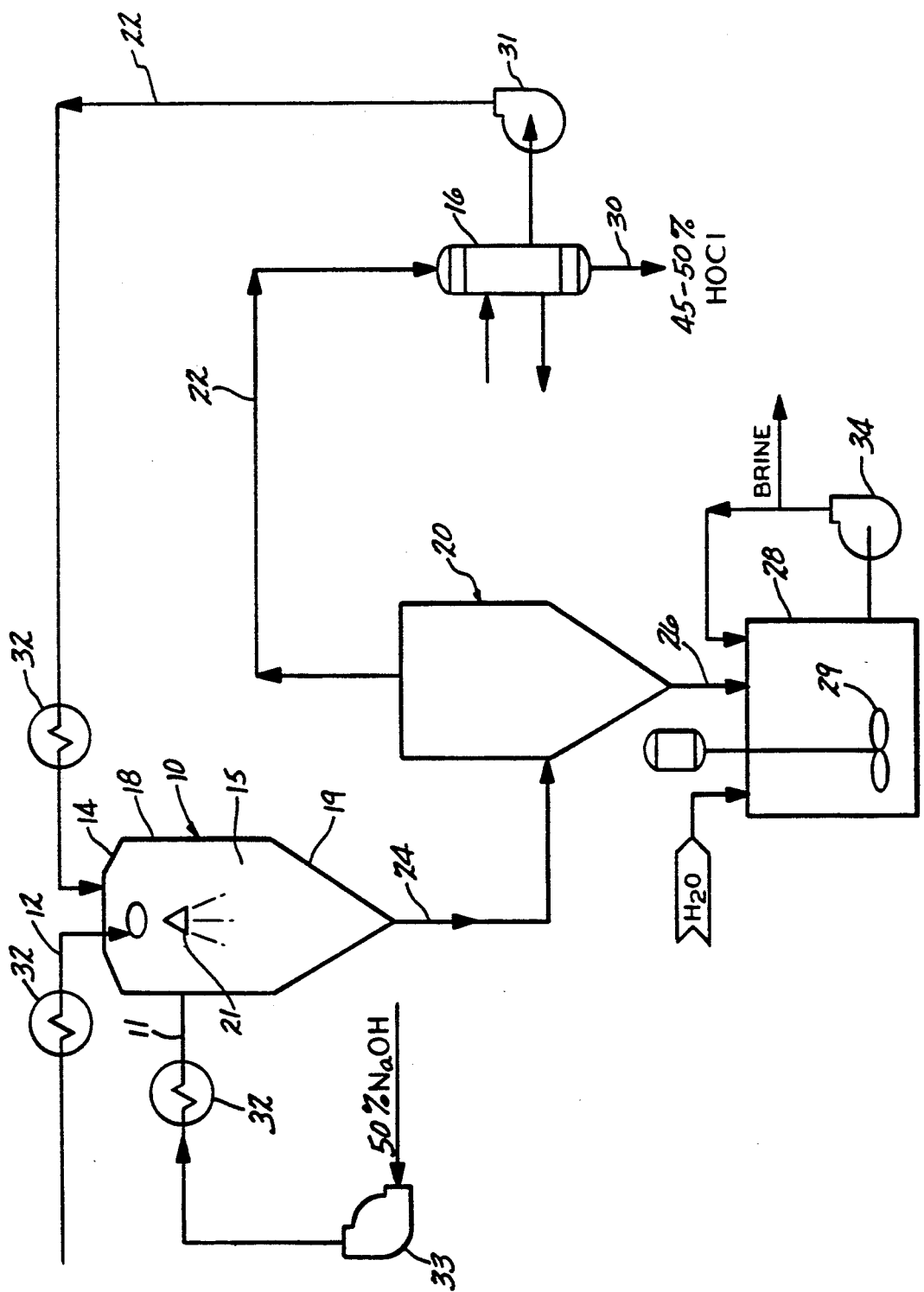

SALT HANDLING APPARATUS FOR A HYPOCHLOROUS ACID REACTOR

This application is a division of application Ser. No. 07/353,573, filed May 18, 1989, still pending.

BACKGROUND OF THE INVENTION

This invention relates generally to the solids discharge handling apparatus associated with a reactor vessel system and, more specifically to that apparatus associated with a reactor vessel for the production of hypohalogenated acid by the mixing and reaction therein of an alkali metal hydroxide and a gaseous halogen. A preferred product acid is hypochlorous acid.

Hypochlorous acid is used extensively in the preparation of chlorohydrin and chloramines. Chloroisocyanurates are typical examples. Hypochlorous acid has been produced by several processes or techniques. The use of dilute hypochlorous acid and large quantities of halogen to produce hypohalites, such as sodium hypochlorite, is recent.

One technique employs the process in which chlorine, steam and air are bubbled through an aqueous solution of an alkali earth metal hypochlorite, such as calcium hypochlorite, to remove the resulting hypochlorous acid in vapor form. The hypochlorous acid is then condensed and stored for use. This process, however, produces a large volume of undesirable by-product, in the form of calcium chloride.

Another process uses a low concentration of aqueous caustic solution to scrub chlorine gas. However, the solution has an available chlorine content of about only 5% and, because of the chloride ion content, the hypochlorous acid that is formed quickly decomposes, most preferably to chloric acid.

Another related process prepares a solid mixture of alkali metal hypochlorite and alkali metal chloride by reacting chlorine gas with a spray of alkali metal hydroxide, while drying with a gas the reactants and product. Some cooling of the reacting chemicals and the drying gas may be done. The primary products of this process have very limited utility.

A more recent process, which produces hypochlorous acid vapor, sprays aqueous alkali metal hydroxide in droplet form or solid alkali metal hydroxide particles into gaseous chlorine. This approach attempts to utilize droplet sizes to attain the maximum surface to volume ratio possible. Droplets having an average diameter of less than about 1000 microns are employed.

These previous processes, and the apparatus employed to produce these processes, have suffered from not achieving substantially complete reactions between the chlorine and the alkali metal hydroxide. A critical factor in determining the complete reaction is the droplet size of the alkali metal hydroxide. It is also desirable that any hypochlorous acid produced and any water present be readily vaporizable. The salt particles produced as by-products in any process should be dry to facilitate handling and be continuously removable from the reaction to prevent the salt driven decomposition of the hypochlorous or other hypohalogenated acid from occurring. Where a cyclone separator has been employed as a solids separation device in the recycled gas stream, there has been an inherent inability of the apparatus to remove salt particles less than 10 microns in size. The carryover this salt in the process, in addition to the previously mentioned decomposition, reduces the recycled gas flow.

A further problem in dealing with by-product salt handling in a hypochlorous acid reactor system lies in the fact that inert gases such as oxygen and nitrogen must be excluded from the system in order to preserve the system's efficient condensation of the product.

These problems are solved in the design of the present invention wherein by-product salt separating apparatus is provided for a reactor vessel for the production of a hypohalogenated acid in which the mixing and reaction of alkali metal hydroxide and a gaseous halogen occurs.

SUMMARY OF THE INVENTION

It is an object of the present invention to provide a solids discharge system for use within a system employing a reactor vessel within which a gas phase controlled reaction occurs to produce a hypohalogenated acid.

It is another object of the present invention to provide a solid by-product salt separating apparatus in a recycled gas system for a reactor vessel in which both a liquid-gas reaction and drying occur to produce a gaseous product and the solid by-product.

It is a feature of the present invention that a bag house is employed as the salt separating apparatus in which a dry chlorine gas is sequentially pulsed through the bags into an atmosphere of chlorine gas, chloroxy compounds including chlorine monoxide and gaseous hypohalogenated acid, and water vapor in the bag house to collect the by-product solid salt.

It is another feature of the present invention that the dust-laden gas passes upwardly through the bag house to deposit entrained salt particles on the salt separating apparatus.

It is still another feature of the present invention that the solid by-product salt can be removed from the salt separating apparatus and fed into a slurrying tank for reuse as a brine feed.

It is an advantage of the present invention that undesirable secondary decomposition reactions are minimized, while permitting the solid by-product salt to be removed from the system.

It is another advantage of the present invention that substantially all of the solid by-product salt is removed from the system in a single step process.

These and other objects, features and advantages are provided in solid separating and discharge handling system for by-product salt handling associated with a reactor vessel for the production of a hypohalogenated acid from the mixing and reaction of an alkali metal hydroxide and gaseous halogen in the reactor vessel. The salt separating apparatus permits the continuous removal of the solids discharged from the system and specifically permits extremely small-sized salt particles to be removed in the 0.5 to 50 micron size range.

BRIEF DESCRIPTION OF THE DRAWINGS

The advantage of this invention will become apparent upon consideration of the following detailed disclosure of the invention, especially when it is taken in conjunction with the drawings wherein:

FIG. 1 is a diagrammatic illustration of the process apparatus including the reactor vessel and the salt separating baghouse apparatus.

DETAILED DESCRIPTION OF THE PREFERRED EMBODIMENT

FIG. 1 shows the reactor, indicated generally by the numeral 10, which reacts the heated liquid alkali metal hydroxide, such as caustic, circulated through feed line 11 by pump 33, with the heated gaseous halogen, such as chlorine, to produce the solid salt crystals and the gaseous product, such as HOCl. Although the reactor will be discussed in terms of producing hypochlorous acid, it is to be understood that any halogen could be employed to produce hypohalogenated acid, for example, hypobromous or hypofluorous acid. The HOCl is condensed in a condenser 16 to produce liquid hypochlorous acid which, for example, can be mixed with a lime slurry to produce calcium hypochlorite. Gaseous chlorine, along with some chlorine monoxide in the recirculation loop 22 of the recycle system, is fed into reactor 10 via gas infeed 12 in the top 14. Top 14 can be in the shape of an inverted funnel that can be constructed of a suitable corrosion resistant material, such as titanium; coated titanium; an alloy of nickel, chrome, molybdenum, iron and other materials; tantalum; and lined carbon steel or lined fiberglass reinforced plastic. The lining can be a suitable polyfluoro-polymer.

The reactor vessel 15 is described in greater detail in copending application Ser. No. 254,634 filed Oct. 7, 1988, assigned to the assignee of the present invention, which is specifically incorporated herein by reference in pertinent part is so far as that disclosure is compatible with this invention. Reactor vessel 15 has a perforated plate (not shown) at the top between the reactor top 14 and the vessel 15. The plate is also made of a suitable corrosion resistant material, such as polytetrafluoroethylene or one of the above mentioned materials with respect to top 14, and serves to create a straight concurrent flow path for the chlorine gas flowing down from the top 14. Ethylene chlorotrifluoroethylene has also been used as a construction material for reactor vessel 15. Vessel 15, similarly can be made from any suitable corrosion resistant material, such as carbon steel with a liner or coating of a suitable perfluoropolymer, such as that sold under the tradename ® PFA.

Reactor vessel 15 has a generally elongated cylindrical central section 18 which tapers to a conically shaped funnel bottom 19 to permit solid alkali metal halide salt, such as NaCl, product to discharge out through a standpipe, not shown, for further processing. Vessel 15 has a caustic feed line 11 that enters through its side and provides the caustic to an atomizer nozzle 21. Nozzle 21 is mounted along the center line of the vessel 15 about six (06) inches below the top of vessel 15. Nozzle 21 creates caustic droplets of a desired size between about 50 to 200 microns which are of sufficient size to absorb virtually all of the gaseous chlorine feed while the chlorine and caustic react fast to produce the gaseous and solid products as shown in the equation:

$$NaOH + Cl_2 \rightarrow HOCl + NaCl$$

The reaction occurs at a pH of about 4 to about 6 with a stochiometric ratio of about 30 to 1 chlorine to caustic. The gaseous HOCl is condensed between about 0 to about 10° C. after exiting the reactor to recover a concentrated HOCl solution. However, when by-product solid salt is retained in the product, the hypochlorous acid decomposes according to the reaction:

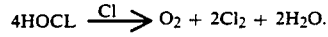
$$4HOCL \xrightarrow{Cl} O_2 + 2Cl_2 + 2H_2O.$$

Hence, it is essential that the quantity of by product salt in the presence of the hypochlorous acid be minimized.

Recycled gases, such as chlorine and chlorine monoxide, are exhausted from the vessel 15 through exhaust duct 24 and are fed back into reactor 10 via a recirculation loop 22, after passing through a baghouse 20, a heat exchanger or condenser 16, and a steam heating unit 32 to achieve the necessary heat, when combined with the heat of reaction to evaporate the hypohalogenated acid, such as hypochlorous acid, and water phase to leave a dry sodium chloride or salt solid by-product. The desired reaction temperature ranges from about 80° to about 100° centigrade. The recycled gases are also used as reactant gases in the production of the hypohalogenated acid.

The recycled gases, for example chlorine and chlorine monoxide, enter the reactor vessel 15, disperse outwardly in the inverted funnel top 14 and pass through the flow directing means or perforated plate (not shown) to enter the reactor vessel 15 in a generally downwardly vertical flow orientation. Fresh halogen gas, for example chlorine, is fed in through chlorine feed line 12 through the reactor top 14 and is directed down over the nozzle or atomizer 21.

Nozzle 21 may be a single fluid atomizer, a two fluid nozzle or a wheel atomizer, dependent upon the viscosity and density of the alkali metal hydroxide being atomized and the amount of pressure to which the liquid is subjected. The materials of construction of the nozzle must be capable of withstanding the harshness of the environment within the reactor.

The vessel 15 has an outlet or exhaust duct 24 at the bottom of the drying zone (not shown) in the funnel or conically shaped bottom 19 to remove the product gas, the unreacted halogen gas and the solid salt by-product into the recirculation loop 22 as previously described. Loop 22 feeds the dust-laden gas into the bottom of the baghouse, which is indicated generally by the numeral 20. The baghouse 20 is generally cylindrically shaped and has the dust-laden gas enter generally tangentially. A cyclonic cone (not shown) can be used about 6 inches above the tangential entry point to remove or separate out the larger dust particles by imparting a centrifugal force on the entrained solids.

Dry chlorine gas is pulsed into the baghouse, which can be any suitably designed commercial product. In this particular instance the baghouse employs a plurality of rows of vertically suspended bags made of appropriately chlorine resistant material, such as polytetrafluoroethylene or other suitable perfluoropolymer or synthetic material, upwardly through which the dust-laden product gas and other gases pass. This upward path of travel causes the smaller sized solid salt by-product, and any other solid materials that were not cyclonically separated out, to be deposited on the outside of the bags. At a given or desired time interval, dry chlorine gas is fed in from a pressurized feed line (not shown) to a plurality of solenoid valves. The solenoid valves are sequentially activated, one valve per row of suspended filter bags, to inflate the bags to create a rippling effect of the rows of bags in the baghouse 20. This rippling effect causes the solid material lodged on the outside surface of the suspended filter bags to be shaken off and fall to the bottom of the baghouse 20. The chlorine is maintained in its feed line at a pressure of about 90 to about 110 pounds per square inch. The number of rows of filter bags in the baghouse 20 is a function of the surface area of each bag, the flow rate of the gas passing through the baghouse 20 and the dust loading in the flow stream of gas that tangentially enters the baghouse 20.

Once the salt by-product has been dislodged from the filter bags, it passes out the bottom of baghouse 20 through discharge line 26 into a slurry tank 28 where water is fed in and a motorized impeller 29 may be employed to agitate the salt and water mixture to form a brine.

The product gas exits the top of the baghouse with chlorine gas and some chlorine monoxide via recirculation loop 22 enroute to condenser or heat exchanger 16. Any suitable conventional exchanger, such as a jacket cooled design, may be employed to condense the gaseous hypohalogenated product gas into its liquid form. The liquid product hypohalogenated acid is removed via product line 30 and the remaining uncondensed gases are recirculated in loop 22 via a blower 31 back to the reactor 10.

Steam heating units 32 are employed to heat the recirculated gas, as well as the chlorine gas in feed line 12 and the caustic in feed line 11.

The vessel 15 has its central section 18 preferably cylindrically shaped, but it could also be polygonal, as appropriate. The cylindrical design has a desired diameter and length. The length extends from the top at the perforated plate (not shown) to the bottom of its drying zone (not shown), just above the funnel bottom 19. The dimensions of the length and the diameter can be selected so that the length to diameter ratio, 1/d, can range from about 1 to 1 to about 1 to 5.

In operation the halogen gas, for example chlorine, is fed into the reactor 10 through feed line 12 and is directed generally vertically downward over nozzle 21. Recycled gases are fed in from the recirculation system via the recirculation loop 22 into the reactor top 14 and are directionalized by a perforated plate (not shown) downwardly into reactor vessel 15. Vessel 15 has an elongate cylindrical section 18 which has a spraying and drying zone (not shown) adjacent the top surrounding nozzle 21 and a drying zone (also not shown) therebelow.

The reacted gases exit the reactor 10 through outlet or exhaust duct 24 for solids removal and recirculation or processing as hypochlorous acid, as appropriate. The solid by-product alkali metal halide, such as sodium chloride, exits the vessel 15 through the conically shaped funnel bottom 19 and is carried in the gas flow stream to the baghouse 20 for separation. This solid by-product alkali metal halogen is dried as it passes down through the drying zone (not shown) in the reactor.

Solid salt by-product is removed from the baghouse 20 via discharge line 26 into slurry tank 28 where it is mixed with water to form brine. The brine is circulated by a pump 34 to other usage points, such as electrolytic cell brine make-up systems or back to the slurry tank 28.

While the preferred process and structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials, and arrangement of parts which will occur to one of skill in the art upon a reading of the disclosure.

What si claimed is:

1. A method of removing solid salt by-product from a gaseous hypohalogenated acid product stream in a reactor that reacts an aqueous alkali metal hydroxide and a gaseous halogen, comprising the steps of:
   (a) feeding a gaseous product dust-laden with by-product salt into a separation means;
   (b) collecting solid salt by-product on the exterior of a plurality of suspended bags;
   (c) pulsing a dry gas consisting essentially of halogen through the plurality of suspended bags to inflate the bags and cause the solid salt by-product to fall from the exterior of the suspended bags into a collection location within the separation means, the halogen gas and gaseous product being fed into a recirculation loop connected to the reactor; and
   (d) removing the separated solid salt by-product from the separation means.

2. The method according to claim 1 further comprising using chlorine as the dry halogen gas.

3. The method according to claim 2 further comprising using sodium hydroxide as the alkali metal hydroxide.

4. The method according to claim 3 further comprising maintaining the separation means in an atmosphere of chlorine gas and chloroxy compounds.

5. The method according to claim 4 further comprising using a perfluoropolymer material in the suspended bags.

6. The method according to claim 5 further comprising feeding the dry chlorine gas into the separation means at a pressure of about 90 to 110 pounds per square inch.

7. The method according to claim 6 further comprising feeding the separated solid salt by-product into a slurry tank to form a brine by the addition of water and by agitation.

8. The method according to claim 1 further comprising mounting the plurality of suspended bags generally vertically in the separation means.

9. The method according to claim 1 further comprising feeding the gaseous product dust-laden with by-product salt tangentially into an accurately shaped separation means.

10. A method of removing solid salt by-product from bag collection means in a baghouse fed with a gaseous hypohalogenated product stream laden with by-product salt dust particles produced in a reactor that reacts an aqueous alkali metal hydroxide and a gaseous halogen, the baghouse being connected to the reactor via a recirculation loop wherein the improvement comprises:
   using a dry gas consisting essentially of halogen to pulsingly inflate the bag collection means to remove into a collection location separated by-product salt particles collected thereon, the dry halogen gas and the gaseous hypohalogenated product being removed from the baghouse into the recirculation loop and recirculated into the reactor.

11. The method according o claim 10 further comprising removing the separated by-product salt from the baghouse.

12. The method according o claim 10 further comprising using chlorine as the dry halogen gas.

13. The method according to claim 12 further comprising using sodium hydroxide as the alkali metal hydroxide.

14. The method according to claim 13 further comprising maintaining an atmosphere of chlorine gas and chloroxy compounds in the baghouse.

15. The method according to claim 14 further comprising feeding dry chlorine gas into the baghouse at a pressure of about 90 to 110 pounds per square inch.

16. The method according to claim 11 further comprising feeding the separated solid salt by-product into a slurry tank.

17. The method according o claim 16 further comprising forming a brine in the slurry tank by the addition of water and agitation.

18. The method according to claim 10 further comprising collecting the separated by-product salt particles collected on the bag collection means a having a size ranging from 0.5 to 50 microns.

19. The method according to claim 3 further comprising producing hypochlorous acid as the hypohalogenated acid.

20. The method according o claim 13 further comprising producing hypochlorous acid as the hypohalogenated acid.

* * * * *